United States Patent Office 3,075,964
Patented Jan. 29, 1963

3,075,964
METHOD OF PREPARING CELLULOSE ACYLATE SULFATES USING SODIUM PHOSPHATE
Carl J. Malm and Martin E. Rowley, Rochester, N.Y., assignors to Eastman Kodak Company, Rochester, N.Y., a corporation of New Jersey
No Drawing. Filed Mar. 27, 1961, Ser. No. 98,239
13 Claims. (Cl. 260—215)

This application is a continuation-in-part of U.S. patent application Serial No. 56,346, filed September 16, 1960.

This invention relates to a method of preparing sodium cellulose acylate sulfates in which cellulose is esterified with a sulfating mixture of lower fatty acid anhydride, an alkali metal salt of acyl sulfuric acid and a weak non-combining acid esterification catalyst.

Various methods have been described in the prior art for preparing cellulose acylate sulfates such as U.S. Patents No. 1,866,532 of Haskins and 2,582,009 and 2,622,079 of Crane. The procedure described by Haskins involved the use of an esterifying bath of a pyridine salt of sulfuric acid in an excess of amine and lower fatty acid anhydride. The quantity of acyl introduced depended on the excess of anhydride employed. The first patent to Crane relates to the preparation of acylate sulfates in acid form followed by neutralization after completion of the reaction. The Haskins method is expensive due to the high cost of organic amines. The first Crane method is critical in operation because of a high concentration of strong mineral acid and, therefore, it is desirable in that procedure to use a lower temperature to minimize degradation, although with good operation, good products are obtained.

The second patent issued to Crane describes the use of an inorganic salt of sulfuric acid together with a slight excess of free sulfuric acid to catalyze the acetylation portion of the reaction. This procedure results in the presence of neutral sodium sulfate in the mass, the presence of which it is desirable to avoid.

One object of our invention is to provide a procedure for the preparation of cellulose acylate sulfates which avoids the formation of sodium sulfate in the esterification procedure. Another object of our invention is to provide a method of making celulose acylate sulfates using a weak acid catalyst to promote the acylation and sulfation which minimizes the danger of chain degradation of the cellulose. Another object of our invention is to provide a process of making cellulose acylate sulfates in which cellulose is esterified with a lower fatty acid anhydride, a salt of acyl sulfuric acid and a weak acid esterification catalyst. A further object of our invention is to employ alkali metal phosphate to provide both phosphoric acid catalyst and alkali metal ion to neutralize the acyl sulfuric acid in preparing an esterification bath for cellulose. Other objects of our invention will appear herein.

In its broader aspects, our invention comprises reacting upon cellulose or a hydroxyl-containing cellulose material such as partially hydrolyzed cellulose acetate with a lower fatty acid anhydride such as acetic, propionic or butyric anhydride in an esterification bath containing an alkali metal salt of acyl sulfuric acid as the sulfating agent and an acid catalyst which is weaker than the first hydrogen and stronger than the second hydrogen of sulfuric acid in acetic acid. Acids which are typical of catalysts of this nature are methane sulfonic acid, phosphoric acid and sulfoacetic acid. The proportion of acid catalyst for use may be selected by the individual operator from a wide range. Quantities of weak acid catalyst as low as 0.05 mole per 100 parts of cellulose will promote the esterification while on the other hand, amounts of acid up to 3 or 4 times the amount of the cellulose may be used.

In one embodiment of the invention, we react alkali metal phosphate and acyl sulfuric acid, and react the resulting mixture, together with lower fatty acid anhydride, with hydroxyl containing cellulose material.

In another embodiment of the invention, we react lower fatty acid anhydride, sodium phosphate and sulfuric acid, and react the resulting mixture, together with lower fatty acid anhydride, with a cellulose compound containing free and esterifiable hydroxyl groups.

The esterification is carried out at a temperature within the range of 60–100° F. No neutral sodium sulfate is formed and substantial esterification of the cellulose is obtained. Ordinarily it is desirable to employ cellulose as the starting material but if desired, one may employ a cellulose ether or a partially hydrolyzed cellulose acetate or cellulose propionate such as a cellulose acetate which has been hydrolyzed down to an acetyl content of 32% or a partially hydrolyzed cellulose propionate having a hydroxyl content of approximately 7% as the starting material for preparing the cellulose acylate sulfate products in accordance with our invention.

The sulfating agent, the neutral alkali metal salt of acyl sulfuric acid, is first prepared and is then incorporated in the acylating mass. For instance, to prepare the sodium salt of acetyl sulfuric acid 7 parts of 95% sulfuric acid are mixed with 25 parts of acetic anhydride, the mixing being carried out at a temperature below 25° C. 5.7 parts of sodium acetate are then added with continued cooling. The mixing is continued until the sodium acetate is dissolved. There is thus obtained a clear solution of the sodium salt of acetyl sulfuric acid containing no excess sulfuric acid therein. To prepare the sulfating acylating mixture there is then added the acid catalyst and the lower fatty acid anhydride and the diluent to be employed, whereupon the cellulose material is mixed therewith at a temperature within the range of 60–100° F. until a test sample shows complete water solubility. In the operation of the procedure in accordance with our invention, the sulfating agent contains no free acyl sulfuric acid and a weak acid catalyst is used in promoting the esterification procedure.

The following examples illustrate our invention:

*Example 1*

To 25 parts of acetic anhydride were added 7 parts of 95% sulfuric acid, keeping the temperature of the solution below 25° C. during the addition. 5.7 parts of sodium acetate were then added, again cooling the mixture. After the last of the sodium acetate had dissolved, 10 parts of an 0.65 molar solution of sulfoacetic acid in 50:50 acetic acid:acetic anhydride were added.

This sulfating mixture was then added to a slurry of 10 parts of wood pulp (which had been water activated and dewatered with acetic acid) in 100 parts of acetic anhydride and 113 parts of acetic acid. The resulting heterogeneous mixture was held at 80° F. with stirring until a test sample showed complete water solubility. This particular reaction mixture and conditions required 45 minutes. The mass was suction filtered, washed with acetic acid, isopropyl alcohol and then with isopropyl alcohol containing enough ammonium hydroxide to neutralize any catalyst and acetic acid remaining. After another wash with isopropyl alcohol, the product was dried at 50° C. overnight. Analyses of the product were: percent total sulfur, 8.7; percent apparent acetyl, 22.5; intrinsic viscosity 2.4.

*Example 2*

A sulfating mixture was prepared as described in Example 1 with the exception of the weak acid catalyst. In place of the sulfoacetic acid, 1.3 parts of 100% phosphoric acid were added. This mixture was then added to a slurry consisting of 10 parts of water-activated acetylation grade pulp, 143 parts of acetic acid and 75 parts of acetic anhydride. With no temperature control, 2¾ hours reaction time was required to obtain a completely water soluble product. The maximum temperature reached was 95° F. The product was isolated as previously described and had the following analyses: percent total sulfur, 8.6; percent apparent acetyl, 23.8.

*Example 3*

300 parts of wood pulp having a moisture content of 7% were mixed with 200 parts of acetic acid in a Werner-Pfleiderer mixer for 1½ hours at 100° F. The mass was then cooled to 70° F. and a mixture of 100 parts of acetic anhydride and 800 parts of acetic acid was added thereto.

There was independently prepared an acetylating-sulfating solution by the following steps: 200 parts of 95% sulfuric acid was slowly added to 700 parts of acetic anhydride, the rate of addition being such that the temperature stayed below 25° C. There was then slowly added 159.5 parts of sodium acetate and the temperature was still maintained below 25° C. 300 parts of 0.65 molar (0.65 mole per 1,000 parts of solvent) sulfoacetic acid were added. This esterifying liquid was added to the mixer containing the cellulose and the reaction was run at 70° F. until a water soluble product was obtained. 200 parts of 75% acetic acid were then slowly added without allowing the temperature to rise, followed by the addition of 1,000 parts of water. After 1 hour at 70° F. there was added 25 parts of sodium acetate and 100 parts of 50% acetic acid following which the product was precipitated by adding 1,600 parts of isopropyl alcohol to the mixer. The product was washed with isopropyl alcohol and was found upon analysis to be water soluble sodium cellulose acetate sulfate having a sulfur content of 8% and an acetyl content of 21%.

We have also found that sodium phosphate, sulfuric acid and a lower fatty acid anhydride may be reacted to prepare the sodium salt of acyl sulfuric acid and liberate phosphoric acid. The mixture of sodium salt of acyl sulfuric acid and phosphoric acid thus prepared mixed with lower fatty acid and lower fatty acid anhydride, such as acetic, propionic or butyric acid and anhydride, may be reacted with cellulose to produce cellulose acylate-sulfates.

Various procedures may be employed in carrying out this feature of our invention. Thus, acyl sulfuric acid may be prepared by adding sulfuric acid to a lower fatty acid anhydride while keeping the temperature below 25° C. and sodium phosphate may be added thereto. Alternatively, sulfuric acid may be added to a mixture of lower fatty acid anhydride, lower fatty acid, and sodium phosphate. Although monobasic or dibasic sodium phosphate may be employed, we prefer to utilize trisodium phosphate. It is desirable that the sodium phosphate be anhydrous to avoid destroying lower fatty acid anhydride.

Examples 6 and 7 which follow illustrate the preparing of cellulose acylate sulfates in accordance with our invention. Examples 4 and 5 illustrate the preparation of sodium acyl sulfuric acid with liberation of phosphoric acid in accordance with our invention.

*Example 4*

A mixture of 61 g. of acetic anhydride, 20.8 g. of acetic acid and 5.9 g. of anhydrous trisodium phosphate was prepared and 11 g. of sulfuric acid (95 percent; sp. gr. 1.83) was mixed therewith. The resulting clear solution which contained the sodium salt of acyl sulfuric acid and phosphoric acid has utility for esterifying cellulose.

*Example 5*

Acyl sulfuric acid was prepared by adding seven parts of 95 percent sulfuric acid to 20 parts of acetic anhydride while keeping the temperature below 25° C. 3.8 parts of anhydrous trisodium phosphate was added to the solution and stirred until the sodium salt of acyl sulfuric acid formed therein was dissolved.

The following examples demonstrate the sulfation and acylation of cellulose with acyl sulfuric acid and phosphoric acid as catalyst, utilizing mixtures like those prepared in Examples 1 and 2.

*Example 6*

The solution prepared in Example 5 was added to a slurry consisting of 10 parts of pulp, 138 parts of acetic acid and 125 parts of acetic anhydride (13 parts of the acetic acid was on the pulp as a result of dewatering the water-activated pulp with acetic acid). The mixture was stirred at room temperature for 3.5 hours with no cooling. The product was collected in a filter, washed several times with isopropanol, then with a solution of isopropanol containing sufficient ammonium hydroxide to neutralize any free acid, and again with isopropanol. The dried product analyzed as follows: 8.18 percent sulfur; 22.7 percent acetyl. It was completely water soluble.

The esterification is conveniently carried out at a temperature within the range of 15–38° C. No neutral sodium sulfate was formed and substantial esterification of the cellulose was obtained.

*Example 7*

The solution prepared in Example 4 was added to a slurry of 15.7 grams of pulp which had been activated with 31.4 grams of acetic acid at 43° C. for one half hour and then cooled. A reaction temperature of 40° C. was maintained until the product was water soluble (6 hours) and 50% aqueous isopropanol was then added to the slurry until a smooth dope was formed. The product was isolated by adding 100% isopropanol, washed in 85% aqueous isopropanol until essentially free of acids, and 5% sodium hydroxide was added to neutralize any traces of free acid. The product was dried at 50° C. and contained 5–10% of combined sulfur and more than 20% acetyl.

Ordinarily it is desirable to employ cellulose as the starting material but if desired, one may employ a cellulose ether such as ethyl cellulose having esterifiable hydroxyl groups or a partially hydrolyzed cellulose ester such as cellulose acetate which has been hydrolyzed down to an acetyl content of 32 percent or cellulose propionate having a hydroxyl content of approximately 7 percent as the starting material for preparing cellulose acylate sulfate in accordance with our invention.

The invention has been described in detail with particular reference to preferred embodiments thereof but it will be understood that variations and modifications can be effected within the spirit and scope of the invention as described hereinabove and as defined in the appended claims.

The compounds of this invention are water soluble and may be made into films which are useful as water soluble wrappings.

We claim:

1. A method of preparing cellulose acylate sulfates which comprises reacting upon a cellulose material containing free and esterifiable hydroxyl groups with a mixture free of acyl sulfuric acid of lower fatty acid anhydride, an alkali metal salt of acyl sulfuric acid as the sulfating agent and as the catalyst, an acid which is weaker than the first hydrogen and stronger than the second hydrogen of sulfuric acid in acetic acid, at a temperature of 60–100° F. until a water soluble product is obtained.

2. A method of preparing a cellulose acylate sulfate which comprises reacting upon cellulose with an esterification mixture free of acyl sulfuric acid comprising a lower fatty acid anhydride, an alkali metal salt of acyl sulfuric acid and as the esterification catalyst, an acid weaker than the first hydrogen and stronger than the second hydrogen of sulfuric acid in acetic acid, at a temperature of 60–100° F. for a time sufficient to impart complete water solubility to the product.

3. A method of preparing cellulose acetate sulfate which comprises esterifying cellulose with an esterification bath comprising a mixture free of acyl sulfuric acid of acetic anhydride, an alkali metal salt of acetyl sulfuric acid and as the catalyst, an acid weaker than the first hydrogen and stronger than the second hydrogen of sulfuric acid in acetic acid, at a temperature of 60–100° F. until the product is completely water soluble.

4. A method of preparing a cellulose acylate sulfate which comprises reacting upon cellulose with an esterification mixture free of acyl sulfuric acid comprising lower fatty acid anhydride, an alkali metal salt of an acyl sulfuric acid and as the catalyst, sulfoacetic acid at 60–100° F. until a product having complete water solubility is obtained.

5. A method of preparing a cellulose acetate sulfate which comprises esterifying cellulose with an esterifying bath free of acyl sulfuric acid comprising acetic anhydride, an alkali metal salt of acetyl sulfuric acid and as the catalyst sulfoacetic acid at 60–100° F. until a product having complete water solubility is obtained.

6. A method of preparing a cellulose acetate sulfate which comprises esterifying cellulose with an esterifying bath free of acyl sulfuric acid comprising acetic anhydride, an alkali metal salt of acetyl sulfuric acid and as the catalyst phosphoric acid at 60–100° F. until a product having complete water solubility is obtained.

7. A method of preparing a cellulose acetate sulfate which comprises esterifying cellulose with an esterifying bath free of acyl sulfuric acid comprising acetic anhydride, an alkali metal salt of acetyl sulfuric acid and as the catalyst methane sulfonic acid at 60–100° F. until a product having complete water solubility is obtained.

8. In the method of sulfating and acylating cellulose material containing free and esterifiable hydroxyl groups with an esterification bath containing a lower fatty acid anhydride and a mixture of an alkali metal salt of acyl sulfuric acid as the sulfating agent and phosphoric acid as the catalyst, the step which comprises preparing the mixture of alkali metal salt of acyl sulfuric acid and phosphoric acid by combining alkali metal phosphate and acyl sulfuric acid.

9. In the method of sulfating and acylating cellulose material containing free and esterifiable hydroxyl groups with an esterification bath containing a lower fatty acid anhydride and a mixture of an alkali metal salt of acyl sulfuric acid as the sulfating agent and phosphoric acid as the catalyst, the step which comprises preparing the mixture of alkali metal salt of acyl sulfuric acid and phosphoric acid by combining lower fatty acid anhydride and alkali metal phosphate and adding sulfuric acid thereto.

10. The method of sulfating and acylating cellulose which comprises adding alkali metal phosphate to acyl sulfuric acid, and reacting the resulting mixture, together with lower fatty acid anhydride, with hydroxyl containing cellulose material.

11. The method of sulfating and acylating cellulose which comprises mixing a lower fatty acid anhydride and sodium phosphate, adding sulfuric acid thereto, and reacting the resulting mixture, together with lower fatty acid anhydride, with a cellulose compound containing free and esterifiable hydroxyl groups.

12. The method of preparing cellulose acetate-sulfate which comprises adding anhydrous trisodium phosphate to acetyl sulfuric acid and reacting the resulting mixture, together with acetic acid and acetic anhydride, with cellulose.

13. The method of preparing cellulose acetate sulfate which comprises mixing acetic anhydride and anhydrous trisodium phosphate, adding sulfuric acid thereto, and reacting the resulting mixture, together with acetic acid and acetic anhydride, with cellulose.

References Cited in the file of this patent

UNITED STATES PATENTS

| 2,143,332 | Sindl | Jan. 10, 1939 |
| 2,628,253 | Dowdall | Feb. 10, 1953 |